(12) United States Patent
Jespersen et al.

(10) Patent No.: US 11,486,350 B2
(45) Date of Patent: Nov. 1, 2022

(54) WIND TURBINE BLADE WITH MULTIPLE SPAR CAPS

(71) Applicant: LM WIND POWER A/S, Kolding (DK)

(72) Inventors: Klavs Jespersen, Kolding (DK); Lars Nielsen, Kolding (DK)

(73) Assignee: LM WIND POWER A/S, Kolding (DK)

( * ) Notice: Subject to any disclaimer, the term of this patent is extended or adjusted under 35 U.S.C. 154(b) by 0 days.

(21) Appl. No.: 17/281,019

(22) PCT Filed: Oct. 23, 2019

(86) PCT No.: PCT/EP2019/078849
§ 371 (c)(1),
(2) Date: Mar. 29, 2021

(87) PCT Pub. No.: WO2020/083976
PCT Pub. Date: Apr. 30, 2020

(65) Prior Publication Data
US 2021/0340947 A1    Nov. 4, 2021

(30) Foreign Application Priority Data

Oct. 25, 2018   (EP) .................................... 18202557

(51) Int. Cl.
*F03D 1/06* (2006.01)
*F03D 13/10* (2016.01)

(52) U.S. Cl.
CPC ........... *F03D 1/0675* (2013.01); *F03D 13/10* (2016.05); *F05B 2220/30* (2013.01); *F05B 2230/23* (2013.01); *F05B 2240/221* (2013.01)

(58) Field of Classification Search
CPC .... F03D 1/0675; F03D 13/10; F05B 2220/30; F05B 2230/23; F05B 2240/221
See application file for complete search history.

(56) References Cited

U.S. PATENT DOCUMENTS

| | | | | |
|---|---|---|---|---|
| 10,451,030 B2* | 10/2019 | Hayden | ................... | B29C 70/00 |
| 10,920,743 B2* | 2/2021 | Danielsen | ............. | B29C 66/721 |
| 2014/0271217 A1* | 9/2014 | Baker | ................... | F03D 1/0633 416/226 |
| 2016/0341178 A1 | 11/2016 | Jorgensen et al. | | |

FOREIGN PATENT DOCUMENTS

| EP | 2778393 A2 | 9/2014 |
|---|---|---|
| WO | 2017216155 A1 | 12/2017 |

OTHER PUBLICATIONS

Extended European Search Report dated May 8, 2019 corresponding to application No. 18202557.7-1007.

* cited by examiner

*Primary Examiner* — Eldon T Brockman
(74) *Attorney, Agent, or Firm* — Nath, Goldberg & Meyer; Jerald L. Meyer; Tanya E. Harkins

(57) ABSTRACT

The present invention relates to wind turbine blade and a method of manufacturing the wind turbine blade. An aerodynamic shell is provided with a recess (70) at its inner surface, the recess (70) extending with-in the shell along a spanwise direction of the blade. A first region of the recess (70) has a first width and a second region of the recess (70) has a second width exceeding the first width. A transition region is provided between the first region and the second region of the re-cess. A first and a second spar cap (80, 82) are arranged within the shell.

15 Claims, 5 Drawing Sheets

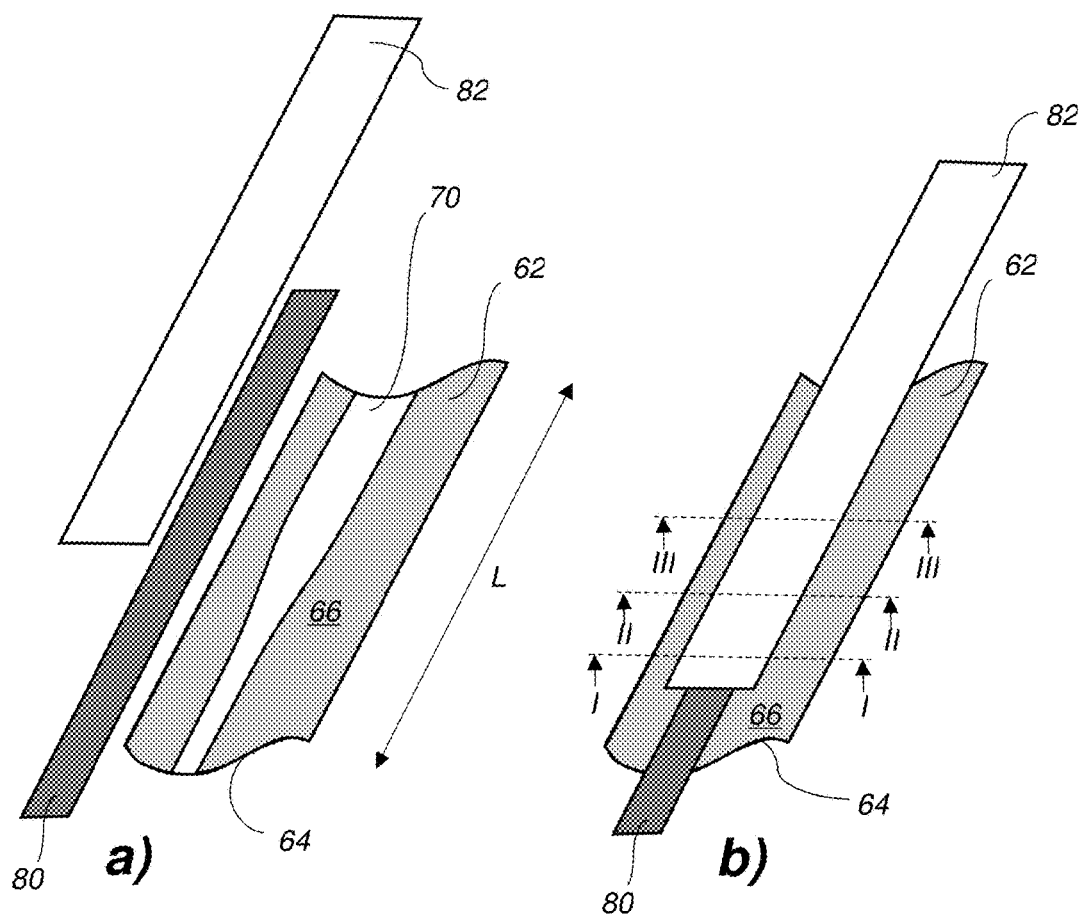
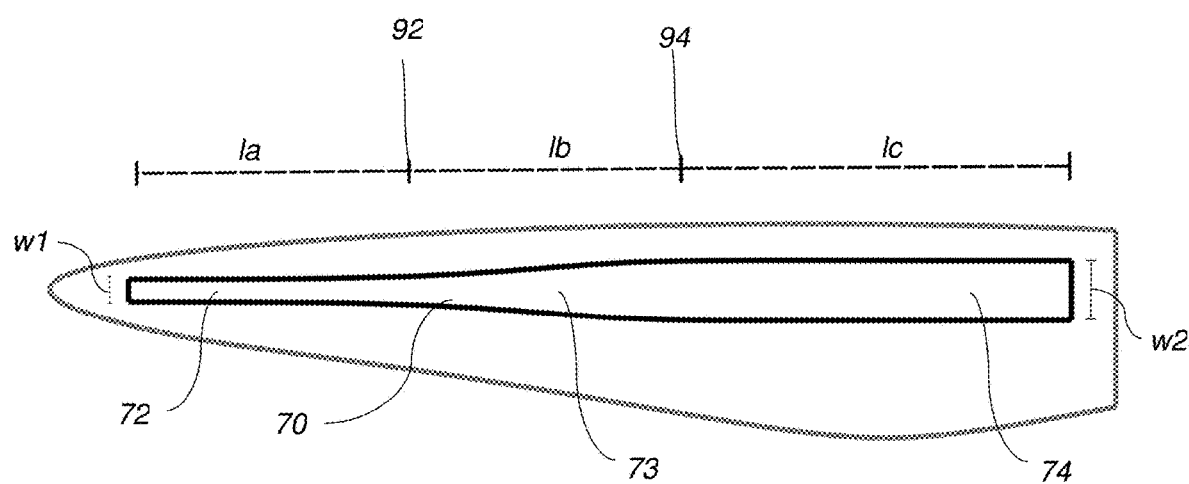
Fig. 5

WIND TURBINE BLADE WITH MULTIPLE SPAR CAPS

This is a National Phase Application filed under 35 U.S.C. 371 as a national stage of PCT/EP2019/078849, filed Oct. 23, 2019, an application claiming the benefit of European Application No. 18202557.7, filed Oct. 25, 2018, the content of each of which is hereby incorporated by reference in its entirety.

TECHNICAL FIELD

The present invention relates to a wind turbine blade and to a method of manufacturing a wind turbine blade.

BACKGROUND

Wind power provides a clean and environmentally friendly source of energy. Modern wind turbines usually comprise a tower, generator, gearbox, nacelle, and one or more rotor blades. Wind turbine blades capture kinetic energy of wind using known foil principles. Modern wind turbines may have rotor blades that exceed 90 meters in length.

Wind turbine blades are usually manufactured by forming two shell parts from layers of woven fabric and resin. Spar caps or main laminates are placed or integrated in the shell parts and are combined with shear webs or beams to form structural support members. Spar caps or main laminates may be joined to, or integrated within, the inside of the suction and pressure halves of the shell.

WO 2014/096004 A2 discloses a method of manufacturing an aerodynamic shell part for a wind turbine blade using an aerodynamic shell part which comprises a recess for arrangement and connection of a spar cap within said recess. The spar cap may be arranged in the recess and bonded to the aerodynamic shell part.

However, as the size of wind turbines increases, the manufacturing of wind turbine blades becomes more challenging and costly. This includes the manufacturing, arrangement and bonding of elongate load bearing structures such as spar caps or main laminates, which are typically made of fibre-reinforced material. Such material is often stacked forming a plurality of stacked layers, while aligning an orientation of the fibres with the longitudinal direction of the structure to provide stiffness in the longitudinal direction. Alignment of the stacked fibre layers is critical for the reliability and strength of the elongated structure. In particular when using such preformed sheets or structures involving carbon fibres or hybrid systems for spar caps or main laminates it is challenging to minimize the formation of folds and wrinkles in the material. Wrinkles may cause fibres to be misaligned which may impact the structural integrity of the blade. Fibre misalignments can result in failure or breakage of the wind turbine blade.

It is therefore an object of the present invention to provide a wind turbine blade with improved stability, easy manufacturing, handling and assembly.

It is another object of the present invention to provide a wind turbine blade with reduced or eliminated fibre misalignments.

It is another object of the present invention to provide an efficient method for manufacturing a wind turbine blade with internal reinforcing structures such as spar caps.

SUMMARY OF THE INVENTION

In a first aspect, the present invention provides a wind turbine blade comprising:

- an aerodynamic shell having an outer surface forming at least part of an exterior surface of the wind turbine blade and an inner surface,
- a recess at the inner surface of the aerodynamic shell, the recess extending within the shell along a spanwise direction of the blade, wherein the recess comprises a first region having a first width, a second region having a second width exceeding the first width, and a transition region connecting the first region with the second region of the recess, and
- a load carrying structure comprising a first and a second spar cap extending within the shell along a spanwise direction of the blade, wherein the first spar cap is arranged at least partly in the recess of the aerodynamic shell, and wherein the second spar cap is arranged on top of at least part of the first spar cap.

The present inventors have found that the above combination of features leads to improvements in the minimization of structural defects resulting from excessive wrinkle formation. Especially for longer wind turbine blades with lengths exceeding 70, 80 or even 90 meters, it may be necessary to include two spar caps in each blade half, the spar caps often having different widths. The present inventors have found that it is important to be able to adjust the width of the recess in relation to the width of the spar caps.

Sudden changes in the width of the recess may cause fibre misalignments. To minimize or eliminate such effects, the present invention provides a smooth transition of recess width by using a transition region between the first region and the second region of the recess. Thus, the spar caps or main laminates transition at a low angle towards the UD direction of the fibres such that fibre misalignment is reduced. The angle may be varied, such as lowered, by varying, such as increasing, the spanwise extent of the transition region.

The wind turbine blade of the present invention will typically be formed as an elongate structure having a longitudinal or spanwise direction. Both the aerodynamic shell and the load carrying structure are therefore preferably also formed as elongate structures connected to each other along one or more connection surfaces extending in the longitudinal direction of the blade. The aerodynamic shell will usually comprise a pressure side shell half and a suction side shell half.

According to an advantageous embodiment, an outer surface of the aerodynamic shell is coated with a gelcoat. Gelcoats may readily be applied to polyester or vinyl ester based composites, since the polyester and vinyl ester may chemically bond with the styrene of the gelcoat. Thereby, the aerodynamic shell comprising a polyester or vinyl ester based resin as matrix material has the advantage that the gelcoat may be applied to the outer surface of the shell during the manufacturing of the shell, e.g. by applying the gelcoat to the mould surface before laying up the fibre-reinforcement material. Thereby, various post-moulding operations, such as painting the blade, may be avoided, whereby the manufacturing process may be simplified, and costs may be lowered.

In particular, a combination of carbon fibre reinforced spar caps connected to an advantageously thin aerodynamic shell comprising glass fibre reinforced polyester and covered by a gel coat enables manufacturing relatively stiff and longer blades, where the post-moulding operations are simplified.

The recess provided at or within the inner surface of the aerodynamic shell extends with-in the shell along a spanwise direction of the blade, preferably over at least 50% of the entire length of the blade. Preferably, the recess extends over at least 70% of the entire length of the blade. The first region of the recess may extend over at least 20% of the entire length of the blade. The second region of the recess may extend over at least 20% of the entire length of the blade. The transition region of the recess may extend over at least 5%, such as at least 10%, of the entire length of the blade. The transition region will typically adjoin the first region in the spanwise direction, and the second region will typically adjoin the transition region in the spanwise direction.

In some embodiments, the recess has a spanwise extent of at least 40 meters. Preferably, the recess has a spanwise extent of at least 50 meters. The recess may have a depth of at least 5 mm. It is preferred that the recess has a depth of at least 20 mm. The first region of the recess may be closer to the tip end of the blade than the second region, whereas the second region may be closer to the root end or the blade than the first region.

The transition region of the recess is advantageously disposed in between the first and the second region. Preferably, the width of the transition region changes over its spanwise extent. The first region and the second region may preferably have substantially constant respective widths along their spanwise extent. It is preferred that the width of the second region is at least 10% higher than the width of the first region of the recess. In some embodiments, the width of the second region is at least 25% higher than the width of the first region of the recess. In a particularly preferred embodiment, the width of the transition region tapers from the second region towards the first region.

In a preferred embodiment, the width of the transition region changes continuously over the spanwise extent of the transition region. In some embodiments, a side of the transition region forms an angle with the longitudinal axis of the wind turbine blade of 10-60 degrees, such as 20-50 degrees.

In some embodiments, a first recess as described above is formed in a pressure side shell part of the aerodynamic shell, and a second recess as described above is formed in a suction side shell part of the aerodynamic shell. Also, a first and second spar cap as described herein may form a load carrying structure part attached to the pressure side of the blade, and a first and second spar cap as described herein may form a load carrying structure part attached to the suction side of the blade.

Taken together, the first and a second spar cap may extend within the shell along at least 90% of the spanwise extent of the blade. Both the first and second spar cap may be pre-formed or pre-manufactured, for instance as a preformed sheet comprising a fibre material, advantageously comprising a plurality of fibre layers. The first spar cap is arranged at least partly in the recess of the aerodynamic shell, preferably such that the recess is completely filled by the first spar cap. The second spar cap is arranged on top of at least part of the first spar cap, preferably over part of the spanwise extent of the first spar cap, such as over at least 5% of the spanwise extent of the first spar cap. Thus, the second spar cap may overlap with the first spar cap.

The load carrying structure may further comprise a shear web or beam connected to the first and second spar caps. In some embodiments, the first spar cap has a substantially uniform width throughout its spanwise or longitudinal extent. In other embodiments, the second spar cap has a substantially uniform width throughout its spanwise or longitudinal extent. The width of the second spar cap is preferably larger than the width of the first spar cap, such as at least 10% larger than the width of the first spar cap. It is preferred that the spar caps and the aerodynamic shell are manufactured separately. Thus, the spar cap may be accurately attached to the blade shell at the correct position.

The first and second spar caps will typically comprise reinforcement fibres. The first and second spar caps may comprise carbon fibres. The spar caps may also comprise hybrid mats comprising both carbon fibres and glass fibres. According to an advantageous embodiment, the reinforcement fibres of the spar caps comprise at least 25%, or at least 30%, or at least 35%, or at least 40%, or at least 50%, or at least 60%, or at least 70%, or at least 80%, or at least 90% carbon fibres. The reinforcement fibres of the spar caps may even be fully constituted by carbon fibres. In an advantageous embodiment, hybrid mats comprising both glass fibres and carbon fibres are used for the spar caps, wherein approximately 35% by volume of the total amount of fibres are carbon fibres.

According to one embodiment, the first and second spar caps comprise glass fibres. In other embodiments, the wind turbine shell may comprise glass fibres. Glass fibres are compatible with polyester based resins, thus providing a good mechanical bonding in the matrix material. Accordingly, the aerodynamic shell may be made from relatively inexpensive materials compared to for instance carbon fibres and epoxy based resins.

The first and second spar caps may also comprise a sandwich core wedge. According to an advantageous embodiment, the sandwich core material of the spar cap(s) is a foamed polymer, and the sandwich core material of the aerodynamic shell is balsawood. This provides for an embodiment, where the blade shell may be manufactured with the less expensive balsawood. However, balsawood may be electrically conductive. By providing a foamed polymer material at the sides of the spar cap, it is possible to electrically insulate the main laminate from the balsawood, which for lightning protection purposes may be advantageous, in particular if the spar cap comprises carbon fibres.

According to another advantageous embodiment, the first and/or second spar cap comprises a first lip or wing arranged along a first side of the spar cap, and a second lip or wing arranged along a second side of the spar cap. The first lip (or wing) and the second lip (or wing) are formed as protrusions extending from and along the first side and second side of the first spar cap. The first lip and the second lip may be formed as fibre-reinforced structures.

In one embodiment, the first fibre lip is attached to an inner surface of the first thickened portion of the aerodynamic shell, and wherein the second fibre lip is attached to an inner surface of the second thickened portion of the aerodynamic shell. In another embodiment, a cavity is formed between an inner surface, the recess and the first surface of the spar cap. The cavity may be formed by the tapering sides of the spar cap and recess and/or it may be formed by the first fibre lip and second fibre lip.

Further the lips or protruding elements may act as a glue barrier so that only the needed glue may be injected into the cavity or that excess glue may be removed by injecting glue from one longitudinal end of the cavity and collecting said excess glue at a second end of the cavity. The spar cap may be connected to the recess of the shell via an adhesive filling the cavity. In practice the adhesive may be applied before the spar cap is arranged in the recess or it may be injected into a cavity formed between the spar cap and the recess.

In a preferred embodiment, the second spar cap is wider than the first spar cap. The second spar cap may be at least 10% wider than the first spar cap. In another embodiment, the second spar cap is at least 25% wider than the first spar cap. The first spar cap may have a width of at least 0.3 m, such as 0.3-2 m. The second spar cap may have a width of at least 0.5 m, such as 0.5-3 m. The first and the second spar caps may have substantially constant widths over their lengths or spanwise extent.

In a preferred embodiment, the shell comprises a pressure side shell half and a suction side shell half, each of the shell halves comprising a recess and a load carrying structure according to the present invention. In a preferred embodiment, the first and second spar caps each comprise a fabric, wherein the fabric of the first spar cap is different from the fabric of the second spar cap. The material of the first spar cap may be different from the material of the second spar cap. In a preferred embodiment, the first and/or second spar cap comprises a hybrid carbon/glass fibre material. In other embodiments, the first and/or second spar cap comprises a glass fibre material. In other embodiments, the first and/or second spar cap comprises a carbon fibre material.

In a preferred embodiment, the first width of the first region of the recess is within a range of 50-90% of the second width of the second region of the recess. In a preferred embodiment, the difference between the first width and the second width is in a range of 50-400 mm. In a preferred embodiment, the spanwise extent of the transition region is 0.5-5 meters. In a preferred embodiment, the recess is substantially bottle-shaped.

In a preferred embodiment, the recess has a base and two opposing side walls, each side wall having a respective upper edge, wherein the transition region of the recess has a proximal end and a distal end, seen in the spanwise direction for example from the tip end of the blade, wherein an angle (α) is formed between the base of the recess and a line extending from the upper edge of a side wall at the proximal end of the transition region to an intersection between the base and the respective sidewall at the distal end of the transition region, wherein said angle is between 1-10 degrees. For example, as seen from the tip end, the proximal end of the transition region is closer than the distal end of the transition region. It is preferred that said angle is below 5 degrees. It is particularly preferred that said angle is below 3 degrees. The side walls of the recess in the first and second region preferably extend substantially parallel to the longitudinal or spanwise extent of the blade.

In some embodiments, the angle Δ is calculated as arctangent of the depth of the recess divided by the length of the transition region. In other embodiments, the angle Δ is calculated as arctangent of the thickness of the thickened portion or the sandwich material divided by the length of the transition region. In other embodiments, the angle Δ is calculated as arctangent of the depth of the recess, the thickness of the thickened portion or the sandwich material divided by the length of the line extending from the upper edge of a side wall at the proximal end of the transition region to an intersection between the base and the respective sidewall at the distal end of the transition region.

According to some embodiments, the side walls of the recess are chamfered. In some embodiments, the sides of the first spar cap are at least partly chamfered such that the chamfered sides of the first spar cap may abut the chamfered side walls of the recess. In a preferred embodiment, the recess is tapered towards the first side of the recess and tapered towards the second side of the recess.

In a preferred embodiment, the first spar cap is tapered towards a first side of the spar cap and further is tapered towards a second side of the spar cap, and wherein the first side of the spar cap substantially abuts or adjoins the first side of the recess, and the second side of the spar cap substantially abuts or adjoins the second side of the recess.

In a preferred embodiment, the aerodynamic shell comprises a first thickened portion laterally adjoining the recess at a first side of the recess and a second thickened portion laterally adjoining the recess at a second side of the recess. The first thickened portion and/or the second thickened portion may be formed as a sandwich structure comprising a number of outer skin layers, a number of inner skin layers, and an intermediate sandwich core material. The first thickened portion and/or the second thickened portion may have a thickness of 5-50 mm. Thus, the sandwich structure may have a thickness of 5-50 mm.

Thus, the recess may be formed by having a non-thickened portion or recess shell part between the first thickened portion and the second thickened portion. The recess shell part may simply comprise a number of fibre layers, e.g. corresponding to the inner and outer skin of the juxtaposed thickened portions. The intermediate sandwich core material may be balsawood. The intermediate core material may also be foamed polymer.

In a preferred embodiment, the first thickened portion and/or the second thickened portion are formed as a sandwich structure comprising a number of outer skin layers, a number of inner skin layers, and an intermediate sandwich core material.

In a preferred embodiment, the first spar cap and the second spar cap each are premanufactured as a fibre-reinforced object comprising a fibre reinforcement material and a matrix material.

In another aspect, the present invention relates to a method of manufacturing a wind turbine blade, wherein the method comprises the steps of:

manufacturing an aerodynamic shell comprising a recess at the inner surface of the aerodynamic shell, the recess extending within the shell along a spanwise direction of the blade, wherein the recess comprises a first region having a first width, a second region having a second width exceeding the first width, and a transition region connecting the first region with the second region of the recess, and arranging a first spar cap in the shell such that it extends within the shell along a spanwise direction of the blade, wherein the first spar cap is arranged at least partly in the recess of the aerodynamic shell, bonding the first spar cap to the shell, arranging a second spar cap on top of at least part of the first spar cap, bonding the second spar cap to the first spar cap and optionally to the aerodynamic shell.

The step of bonding the first spar cap to the shell may also be carried out after or simultaneously with the steps of arranging a second spar cap on top of at least part of the first spar cap and bonding the second spar cap to the first spar cap. The features and embodiments discussed above with respect to the shell, the recess, the spar caps and other elements of the wind turbine blade likewise apply to the method of manufacturing a wind turbine blade according to the present invention, and vice versa. For example, in the method of the present invention, it is preferred that the second spar cap is wider than the first spar cap.

The aerodynamic shell may be manufactured such that it comprises a first thickened portion at a first side of the recess and a second thickened portion at a second side of the recess. A first side of the first spar cap may substantially abut or adjoin a first side of the recess, and a second side of the first spar cap may substantially abut or adjoin the second side of the recess.

Thus, the aerodynamic shell of the present invention may comprise a first thickened portion at a first side of the recess and a second thickened portion at a second side of the recess. The recess may be tapered towards the first side of the recess and tapered towards the second side of the recess. The first spar cap may be tapered towards a first side of the spar cap, and may be tapered towards a second side of the spar cap. The first side of the spar cap may substantially abut or adjoin the first side of the recess, and the second side of the spar cap may substantially abut or adjoin the second side of the recess.

The first thickened portion may be tapered towards (the first side of) the recess, and the second thickened portion may be tapered towards (the second side of) the recess, and the sides of the spar cap may be tapered correspondingly, such that the spar cap when arranged in the recess abuts the sides of the recess. Thereby, a gradual transition between the spar cap and the shell structure at the recess may be obtained with low transition in stiffness thereby lowering stress concentrations in the final wind turbine blade. The tapering angle of the sides of the recess may for instance be between 10 and 80 degrees. Similarly, the tapering angle of the side of the spar cap may be between 10 and 80 degrees.

The first and second spar caps and/or the aerodynamic shell may advantageously be manufactured via a vacuum assisted resin transfer moulding (VARTM) process. The aerodynamic shell may be manufactured in a first mould part. The first spar cap may be manufactured in a second mould part. The second spar cap may be manufactured in a third mould part. If the aerodynamic shell is manufactured as separate shell parts, such as a pressure side shell part and a suction side shell part that are later adhered to each other along the leading edge and trailing edge of the blade, the separate shell parts may of course be manufactured in separate first mould parts.

Further, the various composite structures in a VARTM method may use a mould structure comprising a rigid mould part and a vacuum bag sealed to the rigid mould part in order to form a mould cavity there between. The fibre-reinforcement material is arranged in the mould cavity, and the matrix material, i.e. the resin, is supplied to the mould cavity.

In further aspects, the present invention relates to a wind turbine blade obtainable by the method of the present invention and to a wind turbine comprising a number of blades according to the present invention such as two or three blades.

The present invention is particularly applicable to large structures. Accordingly, the invention preferably relates to wind turbine blades having a total length of at least 50 meters, such as at least 60, 70, 80 or 90 meters.

A sandwich core material may be sandwiched between an inner and outer skin. The terms "inner" and "outer" are to be understood in relation to the finished wind turbine blade. Thus, the inner skin is the side facing towards the interior of the blade when attached to the aerodynamic shell, whereas the outer skin is the side facing towards the aerodynamic shell.

The spar cap of the present invention may also be termed a main laminate, which usually comprises a plurality of fibre-reinforcement layers forming part of a load carrying structure of the finished wind turbine blade.

As used herein, the term "spanwise" is used to describe the orientation of a measurement or element along the blade from its root end to its tip end. The term "chordwise" is used to describe the orientation of an element or measurement along the blade from its leading edge to its trailing edge. Typically, herein, the width of elements like the width of the recess or the width of the respective spar caps will substantially coincide with the chordwise direction of the blade.

All features and/or embodiments discussed above with respect to the wind turbine blade of the present invention may likewise apply to the method for manufacturing a wind turbine blade according to the present invention, and vice versa.

BRIEF DESCRIPTION OF THE DRAWINGS

The invention is explained in detail below with reference to embodiments shown in the drawings, in which FIG. 4 is a partial perspective view of a shell part of a wind turbine blade of the present invention, FIG. 5 is a schematic top view of a shell part of a wind turbine blade according to the present invention.

DETAILED DESCRIPTION OF THE INVENTION

Figure 1:
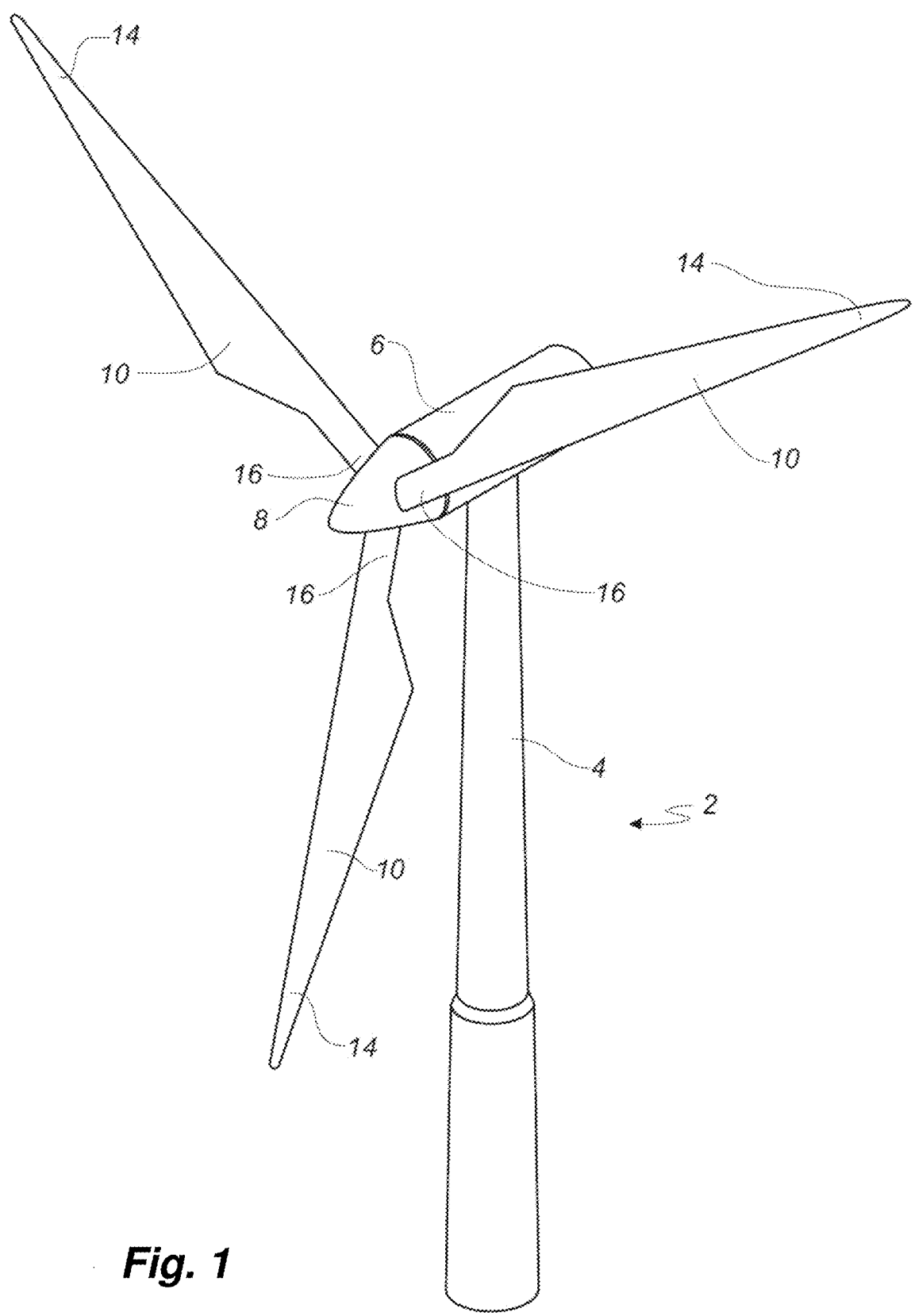
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8. The rotor has a radius denoted R.

Figure 2:
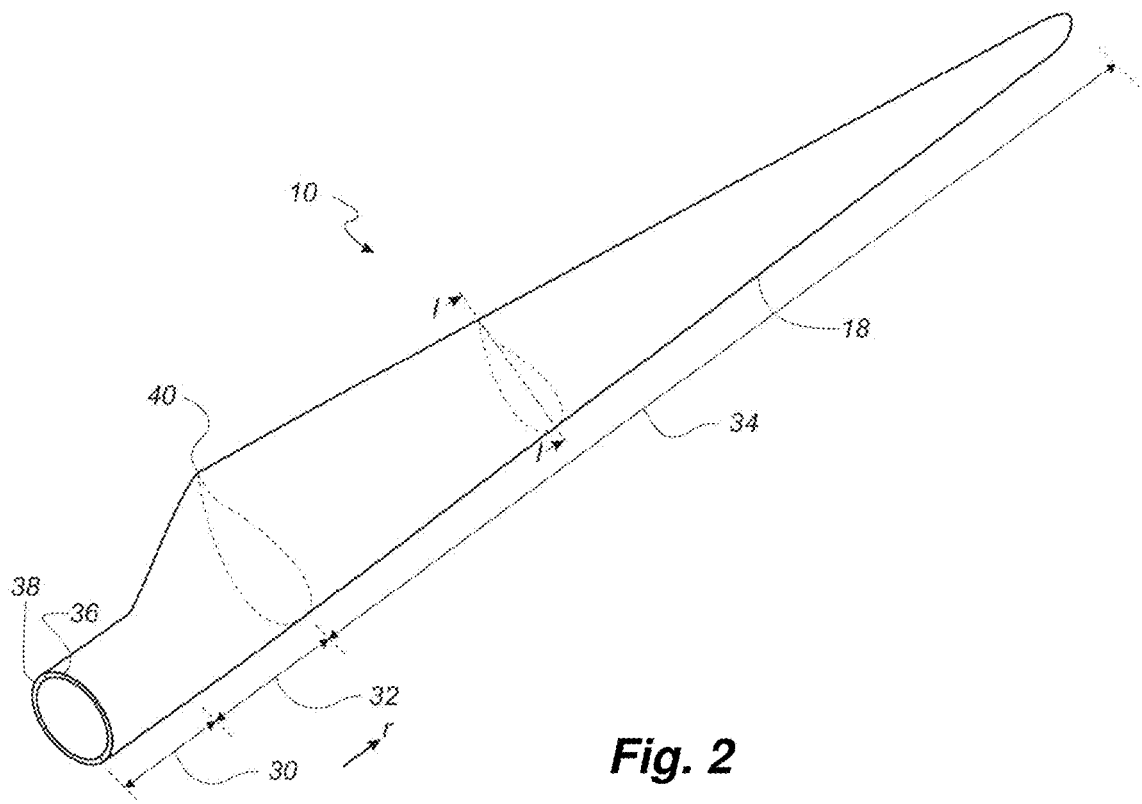
FIG. 2 shows a schematic view of a wind turbine blade.

FIG. 2 shows a schematic view of a wind turbine blade 10. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The blade is typically made from a pressure side shell part 36 and a suction side shell part 38 that are glued to each other along bond lines at the leading edge 18 and the trailing edge of the blade 20.

Figure 3:
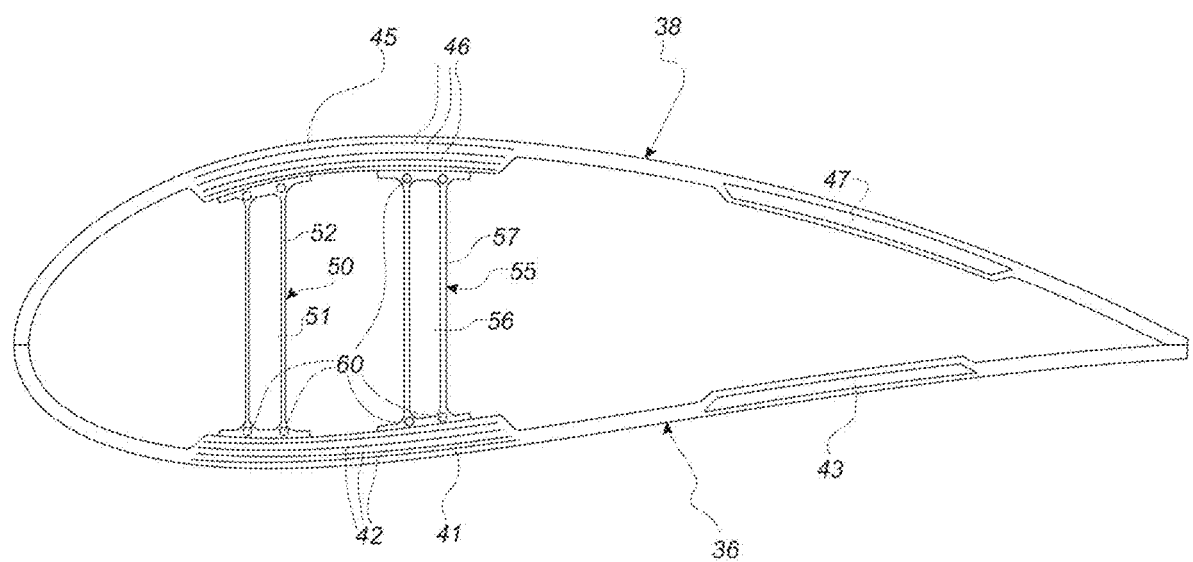
FIG. 3 shows a schematic view of a cross-section of a wind turbine blade.

FIG. 3 shows a schematic view of a cross section of the blade along the line I-I shown in FIG. 2. As previously mentioned, the blade 10 comprises a pressure side shell part 36 and a suction side shell part 38. The pressure side shell part 36 comprises a spar cap 41, also called a main laminate, which constitutes a load bearing part of the pressure side shell part 36. The spar cap 41 comprises a plurality of fibre layers 42 mainly comprising unidirectional fibres aligned along the longitudinal direction of the blade in order to provide stiffness to the blade. The suction side shell part 38 also comprises a spar cap 45 comprising a plurality of fibre layers 46. The pressure side shell part 38 may also comprise a sandwich core material 43 typically made of balsawood or foamed polymer and sandwiched between a number of fibre-reinforced skin layers. The sandwich core material 43 is used to provide stiffness to the shell in order to ensure that the shell substantially maintains its aerodynamic profile during rotation of the blade. Similarly, the suction side shell part 38 may also comprise a sandwich core material 47.

The spar cap 41 of the pressure side shell part 36 and the spar cap 45 of the suction side shell part 38 are connected via a first shear web 50 and a second shear web 55. The shear webs 50, 55 are in the shown embodiment shaped as substantially I-shaped webs. The first shear web 50 comprises a shear web body and two web foot flanges.

The shear web body comprises a sandwich core material 51, such as balsawood or foamed polymer, covered by a number of skin layers 52 made of a number of fibre layers. The second shear web 55 has a similar design with a shear web body and two web foot flanges, the shear web body comprising a sandwich core material 56 covered by a number of skin layers 57 made of a number of fibre layers. The sandwich core material 51, 56 of the two shear webs 50, 55 may be chamfered near the flanges in order to transfer loads from the webs 50, 55 to the main laminates 41, 45 without the risk of failure and fractures in the joints between the shear web body and web foot flange. However, such a design will normally lead to resin rich areas in the joint areas between the legs and the flanges. Further, such resin rich area may comprise burned resin due to high exothermic peeks during the curing process of the resin, which in turn may lead to mechanical weak points. In order to compensate for this, a number of filler ropes 60 comprising glass fibres are normally arranged at these joint areas. Further, such ropes 60 will also facilitate transferring loads from the skin layers of the shear web body to the flanges.

The blade shells 36, 38 may comprise further fibre-reinforcement at the leading edge and the trailing edge. Typically, the shell parts 36, 38 are bonded to each other via glue flanges in which additional filler ropes may be used (not shown). Additionally, very long blades may comprise sectional parts with additional spar caps, which are connected via one or more additional shear webs.

FIG. 4 is a partial perspective view of a shell part 62, such as a shell half, for example a pressure side shell half, of a wind turbine blade according to the present invention. FIG. 4a is an exploded view, whereas FIG. 4b shows the assembled structure. The aerodynamic shell 62 has an outer surface 64 forming at least part of an exterior surface of the wind turbine blade and an opposing inner surface 66. A recess 70 is provided at the inner surface of the aerodynamic shell 62, wherein the recess generally extends within the shell 62 along the spanwise direction L of the blade.

FIG. 4 also illustrates a first spar cap 80 and a second spar cap 82 extending within the shell along the spanwise direction L of the blade. The first spar cap 80 is arranged at least partly in the recess 70 of the aerodynamic shell 62. The second spar cap 82 is wider than the first spar cap 80 and is arranged on top of part of the first spar cap 80, as shown in FIG. 4b. The first spar cap 80 may be made from a different material than the second spar cap 82

As best seen in FIG. 5, the recess 70 may be substantially bottle-shaped. It comprises a first region 72 extending over a spanwise length Ia and having a first width w1 and a second region 74 extending over a spanwise length Ic and having a second width w2 exceeding the first width w1. The first region 72 and second region 74 are connected by a transition region 73 extending over a spanwise length Ib and having a variable width over its length. As seen in the spanwise direction, the transition region 73 has a proximal end 92 and a distal end 94 (as seen from the tip end of the blade).

Figure 6:
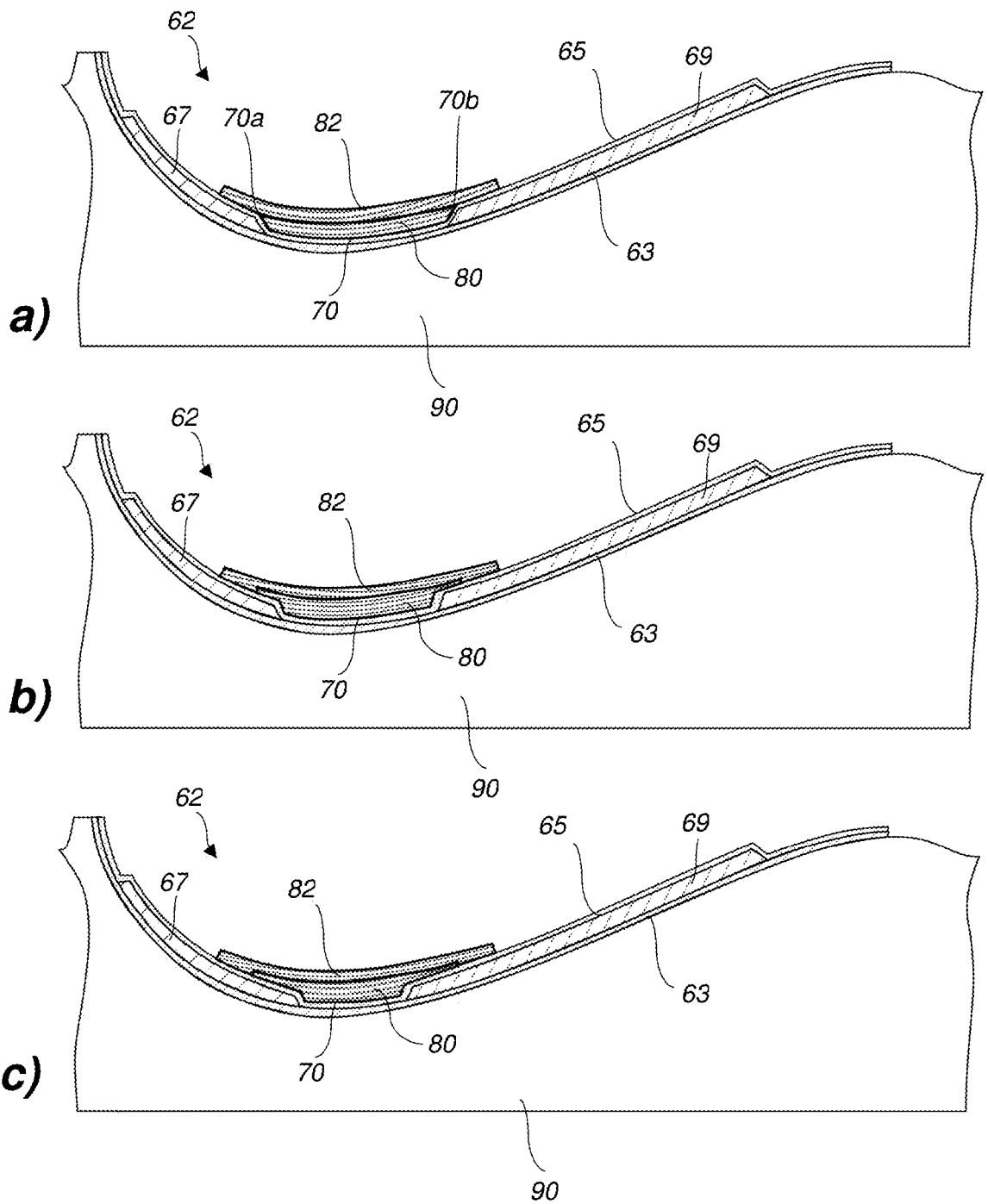
FIG. 6 shows various cross sections through the lines I, II and III of FIG. 4.

FIG. 6 shows various cross sections taken along lines I (FIG. 6c), II (FIG. 6b) and III (FIG. 6a) of FIG. 4. In the embodiment shown in FIG. 6, a shell half 62, for example a pressure side shell half, is manufactured in a mould 90. The mould 90 comprises a moulding surface defining an outer surface of the finished wind turbine blade. The aerodynamic shell half 62 may be manufactured by applying a waxy substance to the moulding surface in order to be able to remove the shell part after moulding. Then a gelcoat may be applied to the moulding surface.

Figure 7:
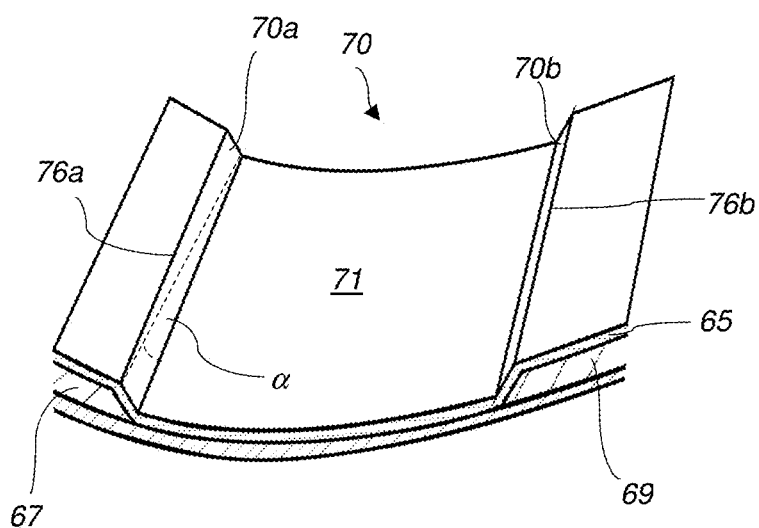
FIG. 7 is a cut-out partial perspective view of a recess in a shell part of a wind turbine blade according to the present invention.

The shell half comprises one or more outer skin layers 63, e.g. made of fibre glass layers, and one or more inner skin layers 65. A first thickened portion 67 and a second thickened portion 69 are formed by a sandwich core material such as balsawood, which is arranged between the skin layers 63, 65. The recess is formed between the two thickened portions 67, 69 such that the first thickened portion 67 laterally adjoins the recess 70 at a first side 70a of the recess and the second thickened portion 69 laterally adjoins the recess 70 at a second side 70b of the recess 70. As seen in FIGS. 6 and 7, the sides 70a, 70b of the recess are advantageously chamfered.

The partial perspective view of FIG. 7 further illustrates the recess 70 as having a base 71 and two opposing side walls 70a, 70b, each side wall having a respective upper edge 76a, 76b. It is preferred that the transition region 73 of the recess 70 has a proximal end 92 and a distal end 94 as seen in FIG. 5. FIG. 7 illustrates an angle Δ formed between the base 71 of the recess 70 and a hatched line (see hatched line) extending from the upper edge 76a of sidewall 70a at the proximal end to an interface or intersection between the base 71 and sidewall 70a at the distal end. Said angle is preferably as low as possible, such as below 3 degrees to minimize wrinkle formation.

The invention has been described with reference to advantageous embodiments. However, the scope of the invention is not limited to the illustrated embodiment, and alterations and modifications can be carried out without deviating from the scope of the invention. While the invention has been described referring to a first spar cap and a second spar cap, it is recognised that the two parts may also be parts of a single spar cap or load-carrying structure.

LIST OF REFERENCE NUMERALS 4 tower
6 nacelle
8 hub
10 blades
14 blade tip
16 blade root
18 leading edge
20 trailing edge
30 root region
32 transition region
34 airfoil region
36 pressure side shell part
38 suction side shell part
40 shoulder
41 spar cap
42 fibre layers
43 sandwich core material
45 spar cap
46 fibre layers
47 sandwich core material
50 first shear web
51 core member
52 skin layers
55 second shear web
56 sandwich core material of second shear web
57 skin layers of second shear web
60 filler ropes
62 shell part
63 outer skin layer
65 inner skin layer
64 outer surface of shell
65 inner surface of shell
67 first thickened portion
69 second thickened portion
70 recess
70a,b sides of recess
71 base of recess
72 first region of recess
73 transition region
74 second region of recess
76 upper edges of recess
80 first spar cap
82 second spar cap
90 mould
92 proximal end of transition region
94 distal end of transition region
Ia spanwise length of first region
Ib spanwise length of transition region
Ic spanwise length of second region
L spanwise direction
r distance from hub
R rotor radius
w1 width of first region
w2 width of second region

The invention claimed is:
1. A wind turbine blade comprising:
an aerodynamic shell (62) having an outer surface (64) forming at least part of an exterior surface of the wind turbine blade and an inner surface (66);
a recess (70) at the inner surface (66) of the aerodynamic shell, the recess (70) extending within the shell along a spanwise direction of the blade, wherein the recess (70) comprises a first region (72) having a first width, a second region (74) having a second width exceeding the first width, and a transition region (73) connecting the first region (72) with the second region (74) of the recess (70), wherein a width of the transition region (73) tapers from the second region (74) towards the first region (72); and
a load carrying structure comprising a first and a second spar cap (80, 82) extending within the shell (62) along a spanwise direction of the blade, wherein the first spar cap (80) is arranged at least partly in the recess (70) of the aerodynamic shell, and wherein the second spar cap (82) is arranged on top of at least part of the first spar cap (80).

2. The wind turbine blade according to claim 1, wherein the second spar cap (82) is wider than the first spar cap (80).

3. The wind turbine blade according to claim 1, wherein the shell comprises a pressure side shell half and a suction side shell half, each of the shell halves comprising a recess (70) and a load carrying structure according to claim 1.

4. The wind turbine blade according to claim 1, wherein the first and second spar caps (80, 82) each comprise a fabric, wherein the fabric of the first spar cap (80) is different from the fabric of the second spar cap (82).

5. The wind turbine blade according to claim 1, wherein the first width of the first region is within a range of 35-90% of the second width of the second region.

6. The wind turbine blade according to claim 1, wherein the difference between the first width of the first region and the second width of the second region is in a range of 50-800 mm.

7. The wind turbine blade according to claim 1, wherein the spanwise extent of the transition region is 0.5-5 meters.

8. The wind turbine blade according to claim 1, wherein the first and/or second spar cap (80, 82) comprise a hybrid carbon/glass fibre material.

9. The wind turbine blade according to claim 1, wherein the recess (70) is substantially bottle-shaped.

10. The wind turbine blade according to claim 1, wherein the aerodynamic shell comprises a first thickened portion laterally adjoining the recess (70) at a first side of the recess (70) and a second thickened portion laterally adjoining the recess (70) at a second side of the recess (70).

11. The wind turbine blade according to claim 10, wherein the first thickened portion and/or the second thickened portion are formed as a sandwich structure comprising a number of outer skin layers, a number of inner skin layers, and an intermediate sandwich core material.

12. The wind turbine blade according to claim 1, wherein the recess (70) has a base (71) and two opposing side walls (76a, 76b), each side wall having a respective upper edge (76a, 76b), wherein the transition region (73) of the recess has a proximal end and a distal end, seen in the spanwise direction, wherein an angle ($\Delta$) is formed between the base (71) of the recess (70) and a line extending from the upper edge (76a) of a side wall (70a) at the proximal end of the transition region to an intersection between the base (71) and the respective sidewall (70a) at the distal end of the transition region (73), wherein said angle is between 0.2-20 degrees.

13. The wind turbine blade according to claim 12, wherein the side walls (76a, 76b) of the recess (70) are chamfered.

14. The wind turbine blade according to claim 1, wherein the first spar cap (80) and the second spar cap (82) each are pre-manufactured as a fibre-reinforced object comprising a fibre reinforcement material and a matrix material.

15. A method of manufacturing a wind turbine blade, wherein the method comprises the steps of:
- manufacturing an aerodynamic shell comprising a recess (70) at the inner surface of the aerodynamic shell, the recess (70) extending within the shell along a spanwise direction of the blade, wherein the recess (70) comprises a first region having a first width, a second region having a second width exceeding the first width, and a transition region connecting the first region with the second region of the recess (70), wherein a width of the transition region tapers from the second region towards the first region;
- arranging a first spar cap (80) in the shell such that it extends within the shell along a spanwise direction of the blade, wherein the first spar cap (80) is arranged at least partly in the recess (70) of the aerodynamic shell;
- bonding the first spar cap (80) to the shell;
- arranging a second spar cap (82) on top of at least part of the first spar cap (80); and
- bonding the second spar cap (82) to the first spar cap (80).

\* \* \* \* \*